US008495705B1

United States Patent
Verma et al.

(10) Patent No.: US 8,495,705 B1
(45) Date of Patent: Jul. 23, 2013

(54) SYSTEMS AND METHODS FOR REPUTATION-BASED APPLICATION OF DATA-LOSS PREVENTION POLICIES

(75) Inventors: Amit Verma, Ghaziabad (IN); Anindya Banerjee, Pune (IN); Rajorshi Ghosh Choudhury, New Delhi (IN); Sumesh Jaiswal, Pune (IN)

(73) Assignee: Symantec Corporation, Mountain View, CA (US)

( * ) Notice: Subject to any disclaimer, the term of this patent is extended or adjusted under 35 U.S.C. 154(b) by 537 days.

(21) Appl. No.: 12/763,593

(22) Filed: Apr. 20, 2010

(51) Int. Cl.
*G06F 7/04* (2006.01)
*G06F 17/30* (2006.01)

(52) U.S. Cl.
USPC .......... 726/2; 726/1; 726/16; 726/17; 726/18; 726/19; 726/21; 726/26; 726/30; 726/33; 713/182; 713/185; 711/163; 711/164

(58) Field of Classification Search
USPC .......................................... 726/26
See application file for complete search history.

(56) References Cited

U.S. PATENT DOCUMENTS

| | | | | |
|---|---|---|---|---|
| 2003/0026257 | A1* | 2/2003 | Xu et al. | 370/392 |
| 2009/0293121 | A1* | 11/2009 | Bigus et al. | 726/22 |
| 2010/0024037 | A1* | 1/2010 | Grzymala-Busse et al. | 726/26 |

OTHER PUBLICATIONS

ThreatSeeker Network—Foundation of the Websense Technology; www.websense.com/content/ThreatSeeker.aspx; taken from site on Feb. 22, 2010.

* cited by examiner

*Primary Examiner* — Nathan Flynn
*Assistant Examiner* — Bryan Wright
(74) *Attorney, Agent, or Firm* — ALG Intellectual Property, LLC (57) ABSTRACT

A computer-implemented method for data-loss prevention may include: 1) identifying data associated with a user, 2) determining that the data is subject to a data-loss-prevention scan, 3) identifying a data-loss-prevention reputation associated with the user, and then 4) performing a data-loss-prevention operation based at least in part on the data-loss-prevention reputation associated with the user. Various other methods, systems, and computer-readable media are also disclosed.

19 Claims, 6 Drawing Sheets

SYSTEMS AND METHODS FOR REPUTATION-BASED APPLICATION OF DATA-LOSS PREVENTION POLICIES

BACKGROUND

In the electronic information age, people may share, access, and disseminate high volumes of information. The ease with which information may be disseminated electronically is empowering. At the same time, the workforce has become increasingly mobile, and the ubiquity of high-speed Internet access, smart mobile devices, and portable storage means that "the office" may be anywhere. As a consequence, it has become more difficult than ever for organizations to prevent the loss of sensitive data. Organizations are therefore increasingly looking to data-loss prevention ("DLP") solutions to protect their sensitive data.

Traditional DLP systems may employ a variety of heuristics and intercept data at a variety of points in a computing system in efforts to detect and regulate the flow and access of sensitive data. Unfortunately, some heuristics may be computationally intensive, potentially consuming valuable computing resources and/or adding latency to the end-user experience. Furthermore, various heuristic methods may yield an unacceptable rate of false positives or false negatives. Accordingly, the instant disclosure addresses a need for systems and methods that leverage contextual information when selecting and applying data-loss prevention policies and remediations.

SUMMARY

As will be described in greater detail below, the instant disclosure generally relates to systems and methods for data-loss prevention. In one example, one or more of the various systems and methods described herein may accomplish this task by: 1) identifying data associated with a user, 2) determining that the data is subject to a data-loss-prevention scan, 3) identifying a data-loss-prevention reputation associated with the user, and then 4) performing a data-loss-prevention operation based at least in part on the data-loss-prevention reputation associated with the user.

Identifying the data associated with the user may include identifying data in a variety of contexts. For example, identifying the data may include identifying data copied by the user, identifying data transmitted by the user, identifying data accessed by the user, and/or identifying data owned by the user. In some examples, identifying the data associated with the user may include identifying data associated with a group to which the user belongs.

Identifying the data-loss-prevention reputation associated with the user may include a variety of approaches. For example, identifying the data-loss-prevention reputation may include: 1) identifying at least one data-loss-prevention incident associated with the user and then 2) evaluating the data-loss-prevention reputation based at least in part on the data-loss-prevention incident. In some examples, identifying the data-loss-prevention reputation may include: 1) identifying at least one characteristic of the user relevant to assessing the risk of a data-loss-prevention policy violation and then 2) evaluating the data-loss-prevention reputation based at least in part on the characteristic. Examples of this characteristic may include a group to which the user belongs, one or more responsibilities of the user within an organization, the seniority of the user within the organization, and/or input from a supervisor of the user. In some examples, identifying the data-loss-prevention reputation may include identifying a reputation associated with a group to which the user belongs.

The data-loss-prevention operation may include any operation for data loss prevention. For example, the data-loss-prevention operation may include the data-loss-prevention scan. Additionally or alternatively, the data-loss-prevention operation may include a data-loss-prevention remediation. In some examples, performing the data-loss-prevention operation (e.g., the data-loss-prevention scan) based at least in part on the data-loss-prevention reputation may include: 1) performing a partial scan based at least in part on the data-loss-prevention reputation meeting a predetermined threshold, 2) performing a full scan based at least in part on the data-loss-prevention reputation falling below a predetermined threshold, 3) performing a described-content-matching scan based at least in part on the data-loss-prevention reputation meeting a predetermined threshold, 4) performing an exact-data-matching scan based at least in part on the data-loss-prevention reputation falling below the predetermined threshold, and/or 5) performing an indexed-data-matching scan based at least in part on the data-loss-prevention reputation falling below the predetermined threshold.

In some examples, performing the data-loss-prevention operation (e.g., the data-loss-prevention scan) based at least in part on the data-loss-prevention reputation may include selecting a rule set for the data-loss-prevention scan based at least in part on the data-loss-prevention reputation. In some examples, performing the data-loss-prevention operation (e.g., the data-loss-prevention remediation) based at least in part on the data-loss-prevention reputation may include flagging an interaction between the user and the data and/or blocking an attempted interaction between the user and the data.

As will be explained below, by selecting, configuring, and/or performing data-loss-prevention operations based on user reputation, the systems and methods described herein may efficiently enforce data-loss-prevention policies. For example, these systems and methods may perform more expensive and thorough data-loss-prevention scans for untrusted users and/or less expensive and thorough data-loss-prevention scans for trusted users. Additionally or alternatively, the systems and methods described herein may accurately enforce data-loss-prevention policies by enforcing policies more strictly against untrusted users and/or more leniently against trusted users.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for data-loss prevention. In one example, the various systems described herein may accomplish this task by: 1) identifying data associated with a user, 2) determining that the data is subject to a data-loss-prevention scan, 3) identifying a data-loss-prevention reputation associated with the user, and then 4) performing a data-loss-prevention operation based at least in part on the data-loss-prevention reputation associated with the user.

Figure 1:
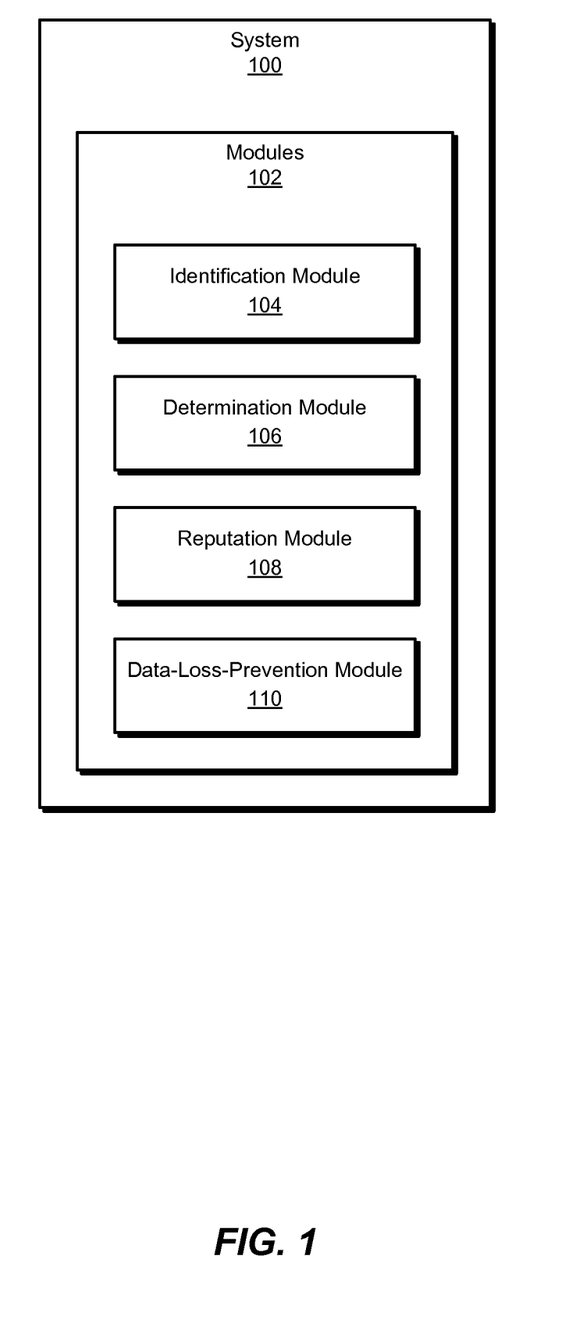
FIG. 1 is a block diagram of an exemplary system for data-loss prevention.
Figure 2:
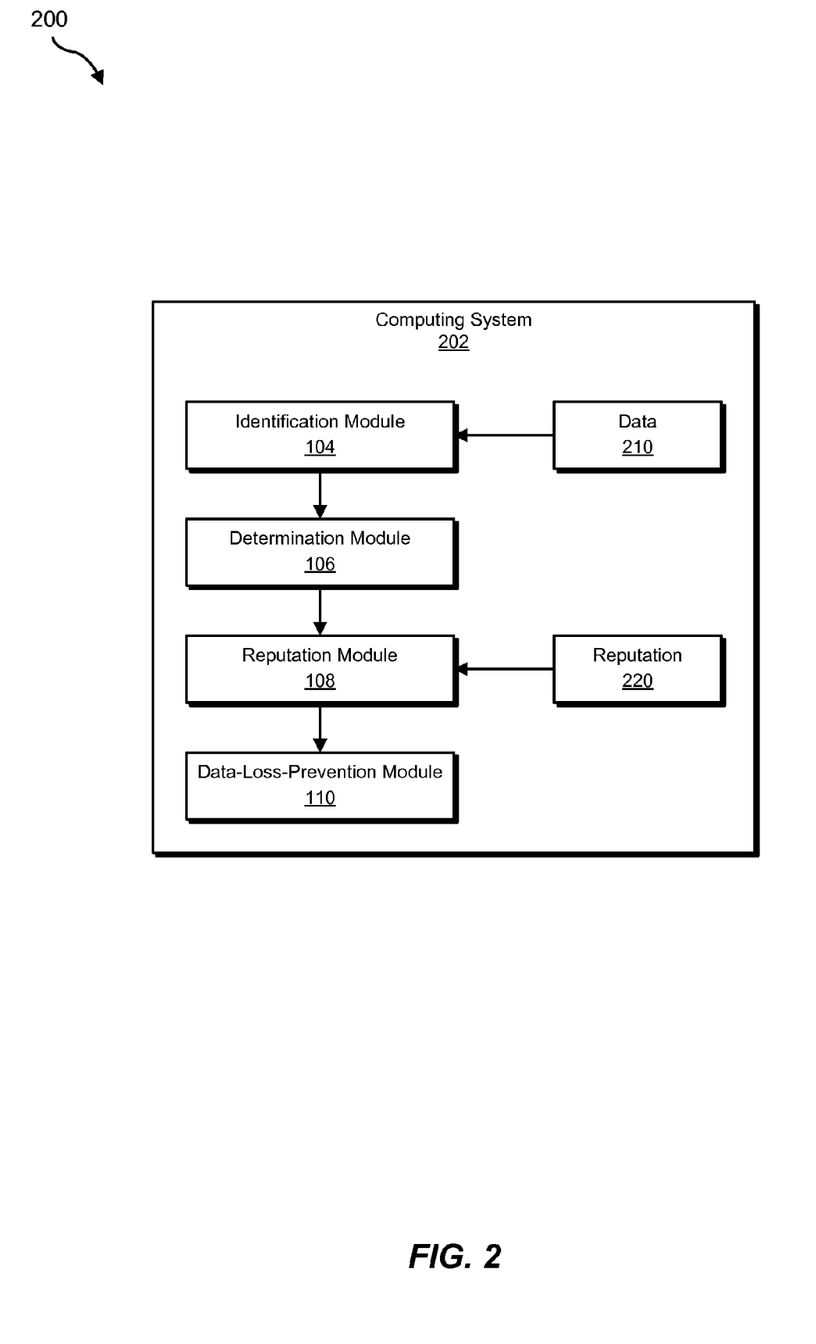
FIG. 2 is a block diagram of an exemplary system for data-loss prevention.

The following will provide, with reference to FIGS. 1-2, detailed descriptions of exemplary systems for data-loss prevention. Detailed descriptions of corresponding computer-implemented methods will also be provided in connection with FIGS. 3-4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for data-loss prevention. As illustrated in this figure, exemplary system 100 may include one or more modules 102 for performing one or more tasks. For example, and as will be explained in greater detail below, exemplary system 100 may include an identification module 104 programmed to identify data associated with a user. Exemplary system 100 may also include a determination module 106 programmed to determine that the data is subject to a data-loss-prevention scan. Exemplary system 100 may further include a reputation module 108 programmed to identify a data-loss-prevention reputation associated with the user.

In addition, and as will be described in greater detail below, exemplary system 100 may include a data-loss-prevention module 110 programmed to perform a data-loss-prevention operation based at least in part on the data-loss-prevention reputation associated with the user. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing system 202), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be deployed in a variety of ways. For example, all or a portion of exemplary system 100 may represent portions of exemplary system 200 illustrated in FIG. 2. As shown in FIG. 2, system 200 may include a computing system 202. In one embodiment, and as will be described in greater detail below, modules 102 from FIG. 1 may program computing system 202 to: 1) identify data associated with a user (such as data 210), 2) determine that the data is subject to a data-loss-prevention scan, 3) identify a data-loss-prevention reputation associated with the user (such as a reputation 220), and then 4) perform a data-loss-prevention operation based at least in part on the data-loss-prevention reputation associated with the user.

Computing system 202 generally represents any type or form of computing device capable of reading computer-executable instructions. Examples of computing system 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Figure 3:
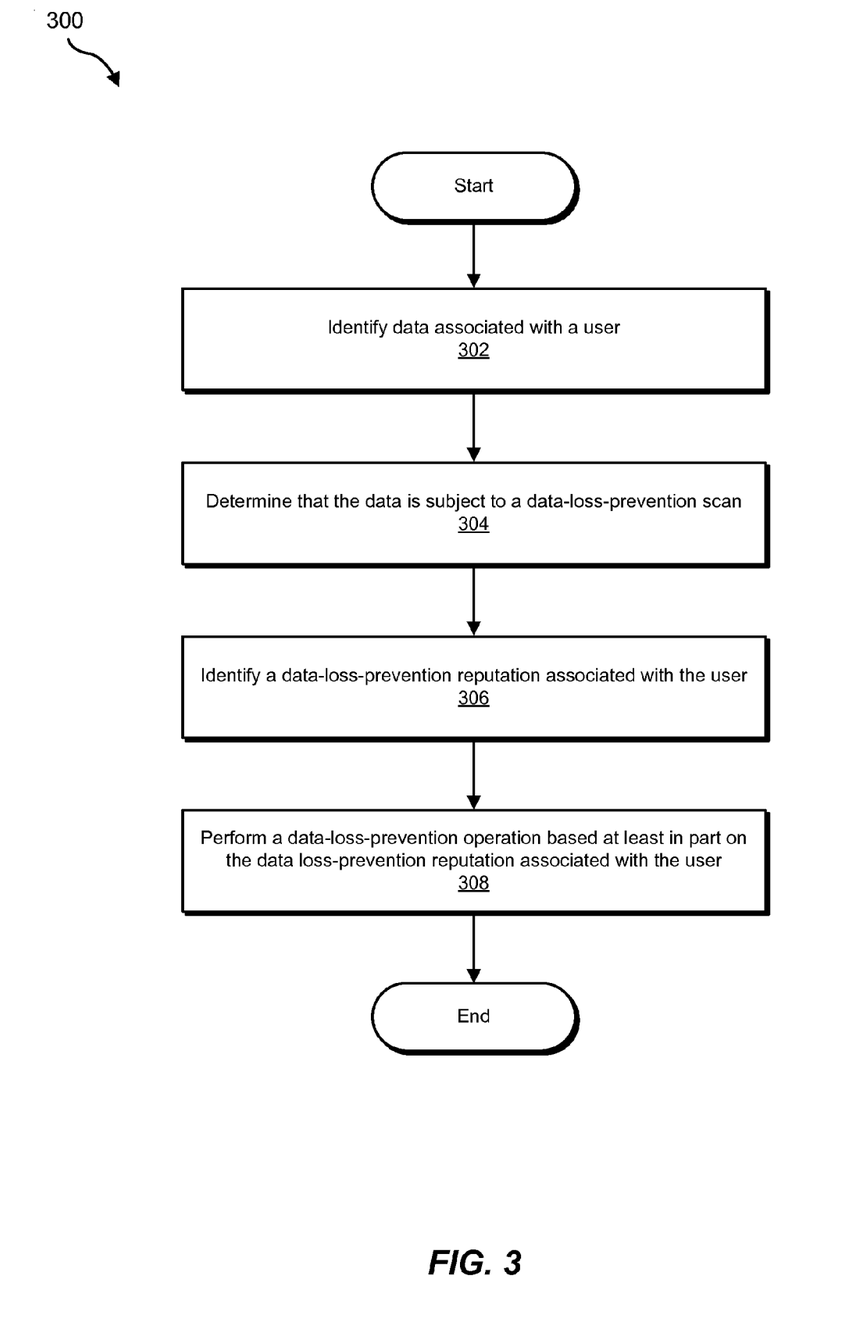
FIG. 3 is a flow diagram of an exemplary method for data-loss prevention.

FIG. 3 is a flow diagram of an exemplary computer-implemented method 300 for data-loss prevention. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may identify data associated with a user. For example, at step 302 identification module 104 may, as part of computing system 202 in FIG. 2, identify data 210.

Identification module 104 may perform step 302 in a variety of contexts. For example, identification module 104 may identify data copied by the user. For example, identification module 104 may identify data copied to an unsecure location, such as a network-attached drive, a removable storage device, etc. In some examples, identification module 104 may associate the data with the user by identifying the copying operation as taking place under an account belonging to the user. Identification module 104 may identify the data copied by the user at any point in the copying operation (e.g., when the user initiates a command to copy the data, as the data is being copied, after the data is copied, etc.).

In some examples, identification module 104 may identify data transmitted by the user. For example, identification module 104 may identify data transmitted in a message and/or an attachment to a message (e.g., email, instant message, etc.). In some examples, identification module 104 may associate the data with the user by identifying the transmission operation as taking place under an account belonging to the user. Additionally or alternatively, identification module 104 may associate the data with the user by identifying an originating address of the message containing the data (e.g., an email address from which the data is sent). Identification module 104 may identify the data transmitted by the user at any point in the transmission operation (e.g., when the user initiates a command to transmit the data, as the data is being transmitted, after the data is transmitted, etc.).

In some additional examples, identification module 104 may identify data accessed by the user. For example, identification module 104 may identify data in a file opened by the user, a database record accessed by the user, etc. In some examples, identification module 104 may associate the data with the user by identifying the accessing operation as taking place under an account belonging to the user. Identification module 104 may identify the data accessed by the user at any point in the accessing operation (e.g., when the user initiates a command to read the data, as the data is being read, after the data is read, etc.).

In certain examples, identification module 104 may identify data owned by the user. For example, identification module 104 may identify a file with file permissions indicating that the user has read access to the file (e.g., identifying the user as an owner, as belonging to a group with read access to the file). Additionally or alternatively, identification module 104 may identify a file stored on a storage device accessible by or otherwise associated with the user. Generally, identification module 104 may identify any file or other data generally accessible by the user.

Figure 4:
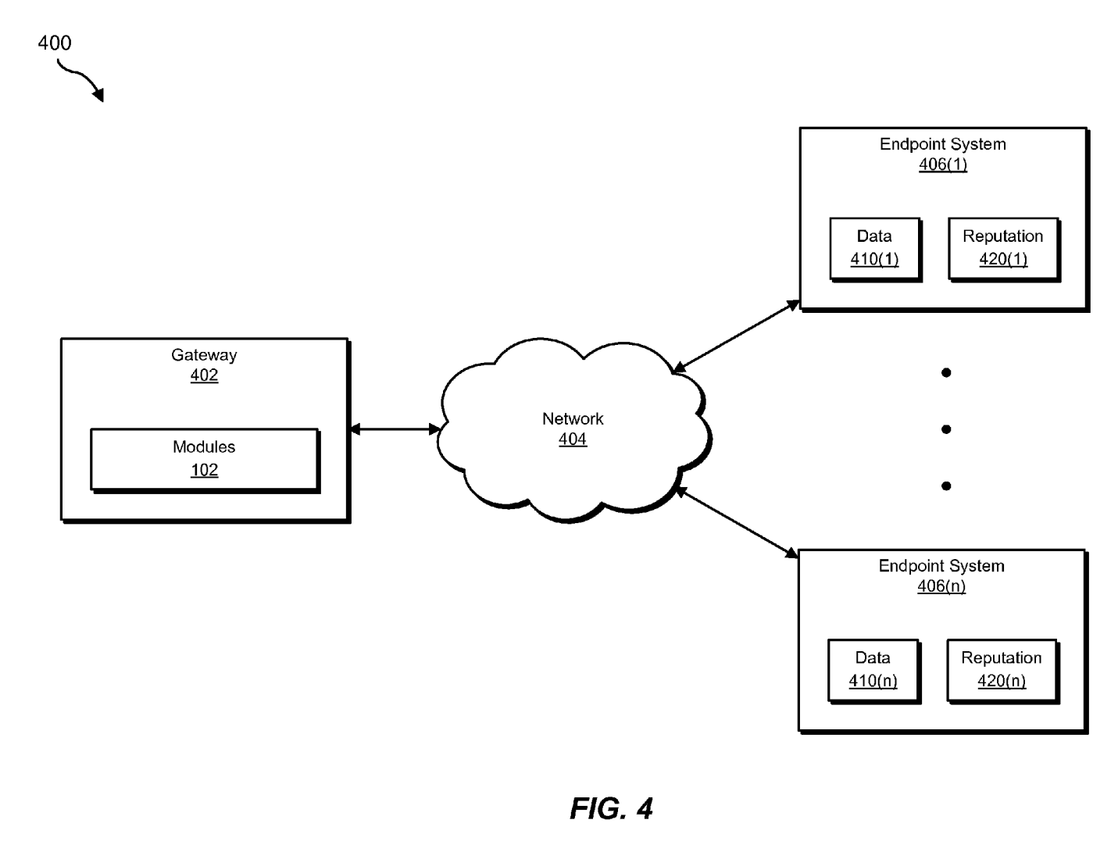
FIG. 4 is a block diagram of an exemplary system for data-loss prevention.

Identification module 104 may perform step 302 within a variety of configurations. For example, FIG. 4 illustrates an exemplary system 400 with gateway 402 in communication with endpoint systems 406(1)-(n) via a network 404. As illustrated in FIG. 4, gateway 402 may be configured with modules 102. Endpoint system 406(1) may include data 410(1) that may be copied to, transmitted from, stored on, and/or manipulated from endpoint system 406(1). Gateway 402 may intercept data 410(1) and/or an instruction relating to data 410(1). Identification module 104 on gateway 402 may accordingly identify data 410(1).

Network 404 generally represents any medium or architecture capable of facilitating communication or data transfer. Examples of network 404 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 404 may facilitate communication or data transfer using wireless or wired connections. In one embodiment, network 404 may facilitate communication between gateway 402 and endpoint systems 406(1)-(n).

Returning to FIG. 3, at step 304 one or more of the systems described herein may determine that the data is subject to a data-loss-prevention scan. For example, at step 304 determination module 106 may, as part of computing system 202 in FIG. 2, determine that data 210 is subject to a data-loss-prevention scan. As another example, determination module 106 may, as part of gateway 402 in FIG. 4, determine that data 410(1) is subject to a data-loss-prevention scan. In some examples, determination module 106 may determine that the data is subject to a data-loss-prevention scan simply by identifying the data within the context of a data-loss-prevention system. In these examples, the data-loss-prevention scan may or may not be subsequently performed depending on other factors. For example, as will be described in greater detail below, a data-loss-prevention reputation may determine whether or not the data is scanned.

As used herein, the term "data-loss-prevention scan" may refer to any scan, analysis, and/or inspection of data and/or metadata that may be employed to ensure compliance with one or more data-loss-prevention policies and/or rules. A "data-loss-prevention policy" may refer to a policy and/or rule that describes, defines, or otherwise identifies content that an organization desires to protect. A data-loss-prevention policy may be configured in a variety of formats or configurations. For example, a data-loss-prevention policy may include signatures, such as hashes, of sensitive data. Additionally or alternatively, a data-loss-prevention policy may include the sensitive data itself. In some embodiments, a data-loss-prevention policy may include one or more entries in a database or list. For example, each row of customer data in a customer data list may include a data-loss-prevention policy. As another example, each product-pricing entry in a product database may include a data-loss-prevention policy. Alternatively, a single data-loss-prevention rule may include a set of database entries or other data entries.

Determination module 106 may perform step 304 in any suitable manner. For example, determination module 106 may determine that the data is subject to a data-loss-prevention scan by determining that the data is in motion (e.g., being copied and/or transmitted), that the data is being accessed, and/or that the data is owned by the user. In some examples, determination module 106 may determine that the data is subject to a data-loss-prevention scan according to a schedule, a random check, and/or any other policy and/or configuration for data-loss-prevention scans.

At step 306, one or more of the systems described herein may identify a data-loss-prevention reputation associated with the user. For example, at step 306 reputation module 108 may, as part of computing system 202 in FIG. 2, identify reputation 220. As another example, reputation module 108 may, as part of gateway 402 in FIG. 4, identify reputation 420(1) (e.g., associated with a user that operates endpoint system 406(1)). As used herein, the term "data-loss-prevention reputation" may refer to any score, rating, class, category, and/or aggregation of information relating to one or more users that may be used to assess the likelihood that data associated with the user or users implicates a data-loss-prevention policy.

Reputation module 108 may perform step 306 in a variety of ways. For example, reputation module 108 may identify at least one data-loss-prevention incident associated with the user and then evaluate the data-loss-prevention reputation based at least in part on the data-loss-prevention incident. Reputation module 108 may identify the data-loss-prevention incident in any suitable manner. For example, reputation module 108 may query a database for data-loss-prevention incidents associated with an account corresponding to the user. As used herein, the term "data-loss-prevention incident" may refer to any event and/or incident in a user's history implicating a data-loss-prevention policy. For example, a data-loss-prevention incident may include an incident in which the user violated a data-loss-prevention policy.

Reputation module 108 may evaluate the data-loss-prevention reputation based on the data-loss-prevention incident in any suitable manner. For example, reputation module 108 may classify the user according to the existence or absence of data-loss-prevention incidents in the user's history. As an example, a user may be classified as "clean" until the user violates a data-loss-prevention policy. After violating the data-loss-prevention policy, the user may be classified as "unclean." In some examples, reputation module 108 may evaluate the data-loss-prevention reputation based on the number of data-loss-prevention incidents, the severity of each incident, how long ago each incident occurred, etc. In these examples, reputation module 108 may produce a score (e.g., a lower score indicating a higher risk and a higher score indicating a lower risk), a classification (e.g., "high risk," "medium risk", "low risk", or "insufficient data"), and/or any other appropriate value.

In some examples, reputation module 108 may identify the data-loss-prevention reputation associated with the user by identifying at least one characteristic of the user relevant to assessing the risk of a data-loss-prevention policy violation by the user and then evaluating the data-loss-prevention reputation based at least in part on the characteristic. Reputation module 108 may identify the characteristic in any suitable manner. For example, reputation module 108 may query a database for characteristics associated with an account corresponding to the user.

The characteristic may include any relevant characteristics. For example, the characteristic may include a group to which the user belongs. Such a group may include a file system permissions group, a list of users, a list of members within a division of an organization, and/or any other suitable group. In this example, reputation module 108 may evaluate the data-loss-prevention reputation based, at least in part, on the group to which the user belongs. For example, some groups may have historically high rates of data-loss-prevention incidents. If the user belongs to such a group, reputation module 108 may evaluate the data-loss-prevention reputation more severely.

In some examples, the characteristic may include a responsibility of the user within an organization. For example, the user may have responsibilities within an organization to share information outside the organization (e.g., the user works in public relations, marketing, etc.). Reputation module 108 may accordingly evaluate the data-loss-prevention reputation more strictly, given an increased risk of exposure of sensitive information due to the responsibility.

The characteristic may also include the seniority of the user within the organization. For example, reputation module 108 may evaluate the data-loss-prevention reputation of a user new to the organization as higher risk (e.g., more prone to accidentally leaking sensitive data due to ignorance). Additionally or alternatively, reputation module 108 may evaluate the data-loss-prevention reputation of a user soon to leave the organization as higher risk.

In some examples, the characteristic may include input from a supervisor of the user. For example, the supervisor may rate the user based on expected compliance with data-loss-prevention policies. Additionally or alternatively, the supervisor may categorize data-loss-prevention incidents relating to the user (e.g., as "accidental" or "intentional"). Reputation module 108 may evaluate the data-loss-prevention reputation of the user accordingly.

Reputation module 108 may use characteristics of the user in addition to and/or in conjunction with past data-loss-prevention incidents associated with the user. For example, reputation module 108 may rely on characteristics of the user if the user has an insufficient history (e.g., too few data transactions) to evaluate a reputation based on incidents. Additionally or alternatively, reputation module 108 may modify the interpretation of a data-loss-prevention incident based on a characteristic (e.g., weighting an incident more if deemed to be "intentional" by a supervisor).

In some examples, reputation module 108 may identify the data-loss-prevention reputation of the user by identifying a reputation associated with a group to which the user belongs. For example, reputation module 108 may evaluate the reputation of users on a group basis (e.g., all users in the group share a reputation). In these examples, reputation module 108 may use data-loss-prevention incidents associated with users belonging to the group and/or characteristics of users belonging to the group. In some examples, reputation module 108 may propagate reputation information between endpoint machines of users. Using FIG. 4 as an example, reputation module 108 may replicate reputations 420(1)-(n) across endpoint systems 406(1)-(n) and/or gateway 402.

At step 308, one or more of the systems described herein may perform a data-loss-prevention operation based at least in part on the data-loss-prevention reputation associated with the user. For example, at step 308 data-loss-prevention module 110 may, as part of computing system 202 in FIG. 2, perform a data-loss-prevention operation with respect to data 210. As another example, data-loss-prevention module 110 may, as part of gateway 402 in FIG. 4, perform a data-loss-prevention operation with respect to data 410(1).

Data-loss-prevention module 110 may perform step 308 with a variety of operations. For example, the operation may include the data-loss-prevention scan. In this example, data-loss-prevention module 110 may perform the data-loss-prevention operation (e.g., the data-loss-prevention scan) based at least in part on the data-loss-prevention reputation in a variety of ways. For example, if the data-loss-prevention reputation meets a predetermined threshold (e.g., the user presents a sufficiently low risk), data-loss-prevention module 110 may perform a partial scan. The partial scan may include a variety of approaches. For example, the partial scan may entail randomly sampling portions of data to scan and/or randomly determining whether to scan data. If the data to scan is a message, the partial scan may entail scanning only the message body and/or headers and skipping attachments. If the data-loss-prevention reputation falls below a predetermined threshold, data-loss-prevention module 110 may perform a full scan. For example, data-loss-prevention module 110 may scan all of the data (e.g., including attachments if the data includes a message). In some examples, data-loss-prevention module 110 may perform the data-loss-prevention scan based on the data-loss-prevention reputation by performing the data-loss-prevention scan because of the data-loss-prevention reputation (e.g., data-loss-prevention module 110 may perform the data-loss-prevention scan because the data-loss-prevention reputation falls below a predetermined threshold). In those cases in which the data-loss-prevention reputation is high (e.g., above a predetermined threshold), data-loss-prevention module 110 may instead skip the data-loss-prevention scan.

In some examples, data-loss-prevention module 110 may select a scanning method based at least in part on the data-loss-prevention reputation. For example, if the data-loss-prevention reputation meets a predetermined threshold, data-loss-prevention module 110 may perform a described-content-matching scan. As used herein, the term "described-content-matching scan" may refer to any scan relying on heuristics, regular expressions, and/or tokens. For example, a described-content-matching scan may search for patterns signaling social security numbers, source code, and/or any other potentially sensitive data.

If the data-loss-prevention reputation falls below a predetermined threshold, data-loss-prevention module 110 may perform a more extensive and/or computationally expensive scan. For example, data-loss-prevention module 110 may perform an exact-data-matching scan based at least in part on the data-loss-prevention reputation falling below the predetermined threshold. As used herein, the term "exact-data-matching scan" may refer to any scan identifying a specific set of data. For example, data-loss-prevention module 110 may perform the exact-data-matching scan by checking the data against a library of sensitive documents.

Data-loss-prevention module 110 may also perform an indexed-data-matching scan based at least in part on the data-loss-prevention reputation falling below the predetermined threshold. As used herein, the term "indexed-data-matching scan" may refer to any scan relying on indexed portions of sensitive data. For example, data-loss-prevention module 110 may perform the indexed-data-matching scan by searching for pieces of information (e.g., such as snippets of source code, financial information, etc.) taken from a library of sensitive documents.

Generally, data-loss-prevention module 110 may perform more extensive and/or more expensive data-loss-prevention scans if the data-loss-prevention reputation indicates a higher risk. Additional examples of expensive data-loss-prevention scans may include performing optical character recognition on an image and comparing the similarity of multimedia files.

In some examples, data-loss-prevention module 110 may perform the data-loss-prevention operation based at least in part on the data-loss-prevention reputation by selecting a rule set for the data-loss-prevention scan based at least in part on the data-loss-prevention reputation. For example, data-loss-prevention module 110 may perform a data-loss-prevention scan using a smaller rule set and/or a rule set with less complicated rules if the data-loss-prevention reputation indicates a lower risk.

As detailed above, the data-loss-prevention operation may include a data-loss-prevention scan. In some examples, the data-loss-prevention operation may include a data-loss-prevention remediation. For example, data-loss-prevention module 110 may perform a data-loss-prevention remediation based, at least in part, on the data-loss-prevention reputation. For example, data-loss-prevention module 110 may determine whether to flag the user's actions with respect to the data as in violation of a data-loss-prevention policy based at least in part on the data-loss-prevention reputation (e.g., employing more leniency if the reputation is good and less leniency if the reputation is bad). Additionally or alternatively, data-loss-prevention module 110 may determine whether to block the user's actions with respect to the data based at least in part on the data-loss-prevention reputation. For example, data-loss-prevention module 110 may allow the user to transmit data that may implicate a data-loss-prevention policy if the user has a clean reputation, merely flagging the event for an administrative review.

As described above, by selecting, configuring, and/or performing data-loss-prevention operations based on user reputation, the systems and methods described herein may efficiently enforce data-loss-prevention policies. For example, these systems and methods may perform more expensive and thorough data-loss-prevention scans for untrusted users and/or less expensive and thorough data-loss-prevention scans for trusted users. Additionally or alternatively, the systems and methods may accurately enforce data-loss-prevention policies by enforcing policies more strictly against untrusted users and/or more leniently against trusted users.

The systems described herein may be deployed in a variety of ways. For example, all or a portion of exemplary system 100 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

Figure 5:
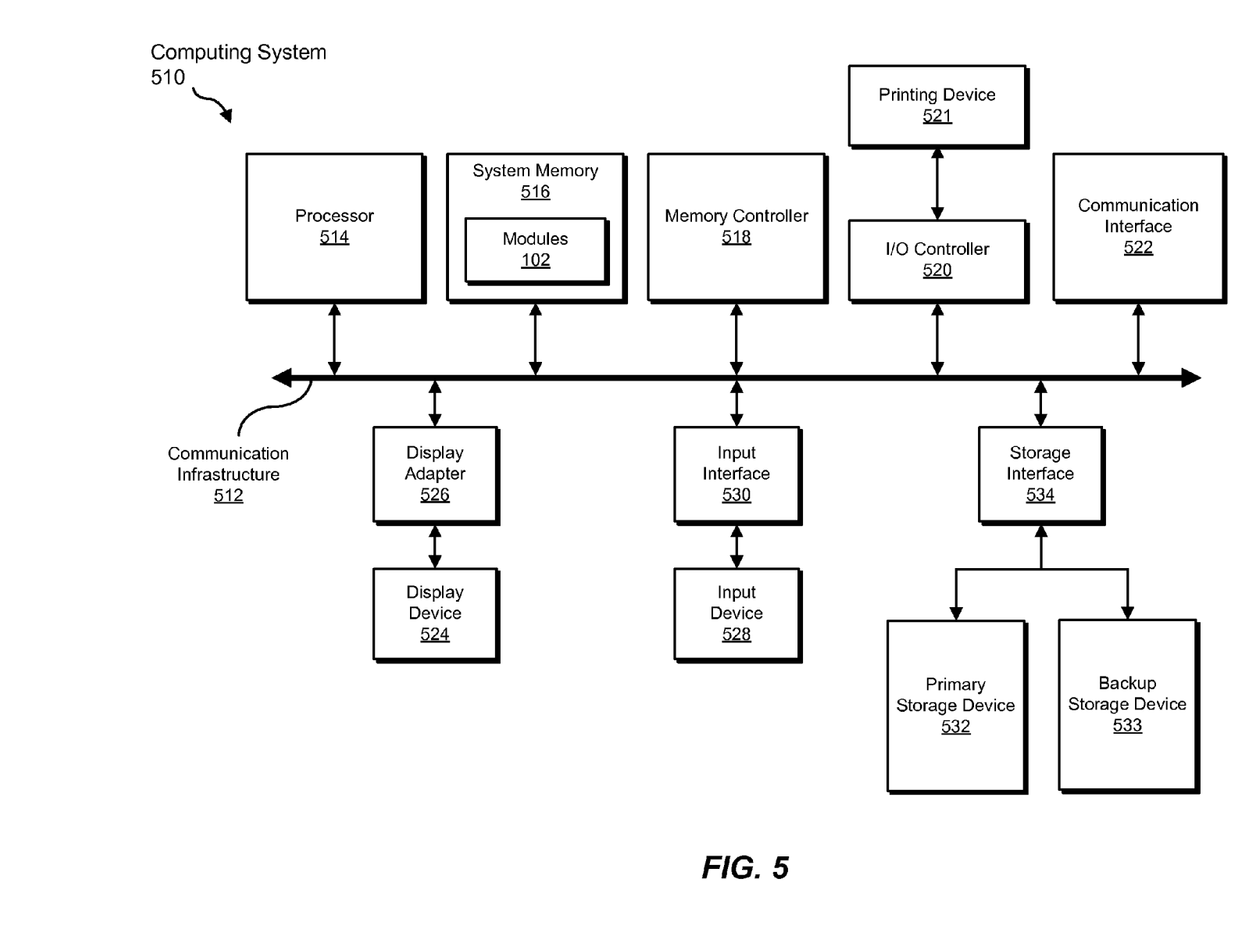
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the identifying, determining, evaluating, performing, and/or selecting steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an input/output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network. In some examples computing system 510 may include a printing device 521 connected via I/O controller 520.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the steps or features described and/or illustrated herein, such as identifying, determining, evaluating, performing, and/or selecting.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the identifying, determining, evaluating, performing, and/or selecting steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the identifying, determining, evaluating, performing, and/or selecting steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the identifying, determining, evaluating, performing, and/or selecting steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the identifying, determining, evaluating, performing, and/or selecting steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
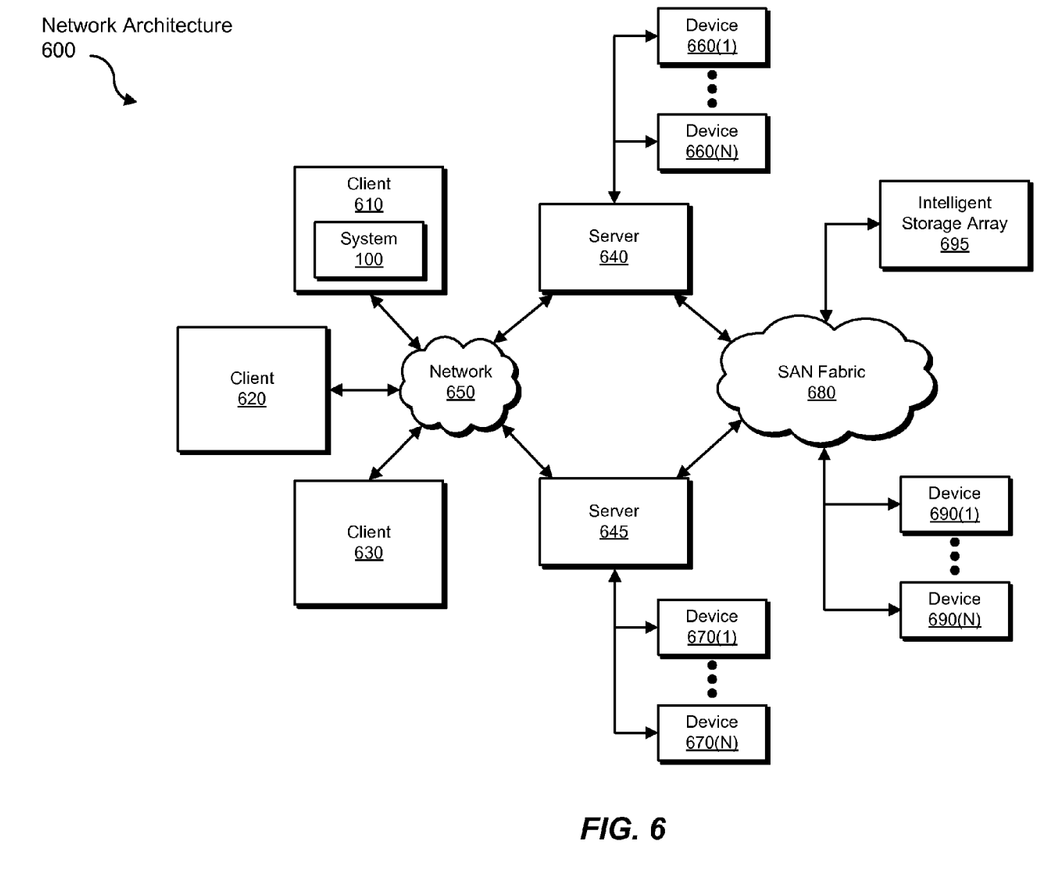
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. In one example, client system 610 may include system 100 from FIG. 1.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the identifying, determining, evaluating, performing, and/or selecting steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for data-loss prevention.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a computing device into a device for efficient data-loss prevention.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for data-loss prevention, the method comprising:
   identifying data associated with a user;
   determining that the data associated with the user is subject to a data-loss-prevention scan;
   identifying a data-loss-prevention reputation associated with the user;
   determining that the data-loss-prevention reputation associated with the user meets a predetermined risk threshold;
   in response to determining that the data-loss-prevention reputation associated with the user meets the predetermined risk threshold, modifying at least one aspect of the data-loss-prevention scan in accordance with the data-loss-prevention reputation associated with the user;
   applying the modified data-loss-prevention scan to the data associated with the user;
   wherein each step of the computer-implemented method is performed by a computing device comprising at least one processor.

2. The computer-implemented method of claim 1, wherein identifying the data associated with the user comprises at least one of:
   identifying data copied by the user;
   identifying data transmitted by the user;
   identifying data accessed by the user;
   identifying data owned by the user.

3. The computer-implemented method of claim 1, wherein identifying the data-loss-prevention reputation associated with the user comprises:
   identifying at least one data-loss-prevention incident associated with the user;
   evaluating the data-loss-prevention reputation of the user based at least in part on the data-loss-prevention incident.

4. The computer-implemented method of claim 1, wherein identifying the data-loss-prevention reputation associated with the user comprises:
   identifying at least one characteristic of the user relevant to assessing the risk of a data-loss-prevention policy violation by the user;
   evaluating the data-loss-prevention reputation of the user based at least in part on the characteristic.

5. The computer-implemented method of claim 4, wherein the characteristic comprises at least one of:
   a group to which the user belongs;
   a responsibility of the user within an organization;
   a seniority of the user within the organization;
   input from a supervisor of the user.

6. The computer-implemented method of claim 1, wherein:
   identifying the data associated with the user comprises:
      identifying data associated with a group to which the user belongs;
   identifying the data-loss-prevention reputation associated with the user comprises identifying a reputation associated with the group to which the user belongs.

7. The computer-implemented method of claim 1, wherein modifying at least one aspect of the data-loss-prevention scan in accordance with the data-loss-prevention reputation associated with the user and applying the modified data-loss-prevention scan to the data associated with the user collectively comprise at least one of:
   skipping at least one aspect of the data-loss-prevention scan;
   performing a partial scan on the data associated with the user;
   performing a described-content-matching scan on the data associated with the user.

8. The computer-implemented method of claim 1, wherein modifying at least one aspect of the data-loss-prevention scan comprises selecting a rule set for the data-loss-prevention scan based at least in part on the data-loss-prevention reputation associated with the user.

9. The computer-implemented method of claim 1, wherein modifying at least one aspect of the data-loss-prevention scan comprises determining whether to apply a data-loss-prevention remediation to the data associated with the user.

10. The computer-implemented method of claim 9, wherein the data-loss-prevention remediation comprises at least one of:
    flagging an interaction between the user and the data associated with the user;
    blocking an attempted interaction between the user and the data associated with the user.

11. A system for data-loss prevention, the system comprising:
    an identification module programmed to identify data associated with a user;
    a determination module programmed to determine that the data associated with the user is subject to a data-loss-prevention scan;
    a reputation module programmed to identify a data-loss-prevention reputation associated with the user;
    a data-loss-prevention module programmed to:
       determine that the data-loss-prevention reputation associated with the user meets a predetermined risk threshold;
       in response to determining that the data-loss-prevention reputation associated with the user meets the predetermined risk threshold, modify at least one aspect of the data-loss-prevention scan in accordance with the data-loss-prevention reputation associated with the user;
       apply the modified data-loss-prevention scan to the data associated with the user;
    at least one processor configured to execute the identification module, the determination module, the reputation module, and the data-loss-prevention module.

12. The system of claim 11, wherein the identification module is programmed to identify the data associated with the user by identifying at least one of:
    data copied by the user;
    data transmitted by the user;
    data accessed by the user;
    data owned by the user.

13. The system of claim 11, wherein the reputation module is programmed to identify the data-loss-prevention reputation associated with the user by:
    identifying at least one data-loss-prevention incident associated with the user;

evaluating the data-loss-prevention reputation of the user based at least in part on the data-loss-prevention incident.

14. The system of claim 11, wherein the reputation module is programmed to identify the data-loss-prevention reputation associated with the user by:
   identifying at least one characteristic of the user relevant to assessing the risk of a data-loss-prevention policy violation by the user;
   evaluating the data-loss-prevention reputation of the user based at least in part on the characteristic.

15. The system of claim 11, wherein the data-loss-prevention module collectively modifies at least one aspect of the data-loss-prevention scan in accordance with the data-loss-prevention reputation associated with the user and applies the modified data-loss-prevention scan to the data associated with the user by at least one of:
   skipping at least one aspect of the data-loss-prevention scan;
   performing a partial scan on the data associated with the user;
   performing a described-content-matching scan on the data associated with the user.

16. The system of claim 11, wherein the data-loss-prevention module modifies at least one aspect of the data-loss-prevention scan by selecting a rule set for the data-loss-prevention scan based at least in part on the data-loss-prevention reputation associated with the user.

17. A non-transitory computer-readable-storage medium comprising one or more computer-executable instructions that, when executed by at least one processor of a computing device, cause the computing device to:
   identify data associated with a user;
   determine that the data associated with the user is subject to a data-loss-prevention scan;
   identify a data-loss-prevention reputation associated with the user;
   determine that the data-loss-prevention reputation associated with the user meets a predetermined risk threshold;
   in response to determining that the data-loss-prevention reputation associated with the user meets the predetermined risk threshold, modify at least one aspect of the data-loss-prevention scan in accordance with the data-loss-prevention reputation associated with the user;
   apply the modified data-loss-prevention scan to the data associated with the user.

18. The computer-implemented method of claim 1, further comprising:
   identifying data associated with an additional user;
   determining that the data associated with the additional user is subject to an additional data-loss-prevention scan;
   identifying a data-loss-prevention reputation associated with the additional user;
   determining that the data-loss-prevention reputation associated with the additional user fails to meet the predetermined risk threshold;
   in response to determining that the data-loss-prevention reputation associated with the additional user fails to meet the predetermined risk threshold, performing at least one of:
      applying the additional data-loss-prevention scan to the data associated with the additional user;
      applying a data-loss-prevention remediation to the data associated with the additional user.

19. The computer-implemented method of claim 18, wherein applying the additional data-loss-prevention scan to the data associated with the additional user comprises at least one of:
   applying a full scan to the data associated with the additional user;
   applying an exact-data-matching scan to the data associated with the additional user;
   applying an indexed-data-matching scan to the data associated with the additional user.

* * * * *